United States Patent
Lamy (12)

(10) Patent No.: US 6,652,093 B1
(45) Date of Patent: Nov. 25, 2003

(54) VARIABLE EYEGLASS FRAME

(75) Inventor: Patrick Lamy, Saillenard (FR)

(73) Assignee: Airess S.A. (FR)

( * ) Notice: Subject to any disclaimer, the term of this patent is extended or adjusted under 35 U.S.C. 154(b) by 0 days.

(21) Appl. No.: 09/687,469

(22) Filed: Oct. 13, 2000

Related U.S. Application Data

(63) Continuation of application No. PCT/FR99/00893, filed on Apr. 15, 1999.

(51) Int. Cl.⁷ .............................. G02C 11/02; G02C 5/14
(52) U.S. Cl. ........................... 351/51; 351/52; 351/119; 351/111
(58) Field of Search .......................... 351/51, 52, 111, 351/41, 119, 121

(56) References Cited

U.S. PATENT DOCUMENTS 5,652,635 A   7/1997   Kirschner ................... 351/52

FOREIGN PATENT DOCUMENTS

| EP | 0 772 065 A1 | 5/1997 |
| FR | 2 547 430 | 12/1984 |
| FR | 2 670 588 | 6/1992 |
| WO | WO 98/23994 | 6/1998 |

*Primary Examiner*—Hung Xuan Dang
(74) *Attorney, Agent, or Firm*—Piper Rudnick LLP

(57) ABSTRACT

A variable eyeglass frame having sidepieces, each sidepiece including a fixed part having a pin, at least one pivotable decorative element movable between two positions on the pin, and a lock, the decorative element being articulated on the pin at least one end of which is interdependent with the sidepiece within one degree of freedom in rotation.

17 Claims, 4 Drawing Sheets

VARIABLE EYEGLASS FRAME

RELATED APPLICATION

This is a continuation of International Application No. PCT/FR99/00893, with an international filing date of Apr. 15, 1999, which is based on French Patent Application No. 98/04684, filed Apr. 15, 1998.

FIELD OF THE INVENTION

This invention pertains to the field of eyeglasses and particularly to frames for eyeglasses worn for vision correction or recreational activities.

BACKGROUND

Eyeglass frames are conventionally constituted of a face part that is extended at both ends by sidepieces that are generally articulated on hinges.

It has been proposed in the prior art to embellish such eyeglass frames by providing modifiable elements on the sidepieces.

As an example, PCT patent WO 98/23994 describes an eyeglass frame structure comprising a transparent central element and a frame located around the element, with fixed parts that hold the transparent element in a fixed manner with respect to the frame. A decorative element is mounted in a manner such that it can turn with respect to the fixed parts from one position in which one decorative aspect of the decorative element is visible to a position in which another decorative aspect of the decorative element is visible.

PCT patent WO 97/44699 also describes eyeglasses comprising a frame designed to hold lenses as well as sidepieces and comprising a block which is fixed by a hinge on the frame, bows as well as a segment located between the block and the bows and mounted on the hinge block in a pivoting manner with respect to the frame. The pivoting segment can be adorned in various forms, present various printed decorations on different sides or be multicolored.

The eyeglass frames of the prior art comprising a modifiable decorative element employ a relatively fragile mechanism. It comprises a pin the two ends of which are mounted on elements that can be temporarily displaced so as to allow pivoting of the decorative element. The lateral sides of the decorative element are plane with and present a section which is identical to the section of the adjacent fixed parts.

The goal of the invention is to make possible a variability in the appearance of the eyeglass frame by means of a robust technical solution that allows the user to modify the appearance of the sidepiece in a simple manner without the risk of weakening the frame.

BRIEF DESCRIPTION OF THE DRAWINGS

More complete comprehension of the invention will be obtained from the description below which refers to a nonlimitative example of implementation in which.

DETAILED DESCRIPTION OF THE INVENTION

The invention pertains to a variable eyeglass frame characterized in that the sidepiece comprises a fixed part and at least one mobile decorative element which can be moved between two positions by pivoting, with said decorative element articulated on a pin at least one end of which is interdependent with the sidepiece according to only one degree of freedom in rotation, with said decorative element comprising locking means.

According to a variant, the decorative element is articulated on a pin one end of which is interdependent with the sidepiece and the other end of which is interdependent with the hinge.

According to a preferred mode of implementation, the primary surfaces of the decorative element have dimensions that are determined so as to extend the fixed part of the sidepiece.

According to a first variant, the decorative element has a cavity in which is housed a spring that exerts pressure on a ball that comes to be positioned in a complementary locking cavity when the decorative element is in position.

According to a second variant, the cavity is oriented perpendicularly to the pin for the pivoting of the decorative element, with said pin presenting diametrically opposite semispherical cavities to receive said ball.

According to a third variant, the decorative element presents a recess for passage of the pivoting pin, which recess is of oblong section so as to provide two opposite preferential positions and to allow constrained switching from one position to the other.

According to a preferred mode of implementation, the decorative element has magnetic locking means that can cooperate according to two positions that are offset by 180° with complementary means provided on the sidepiece or on the hinge of the eyeglass frame.

Figure 1:
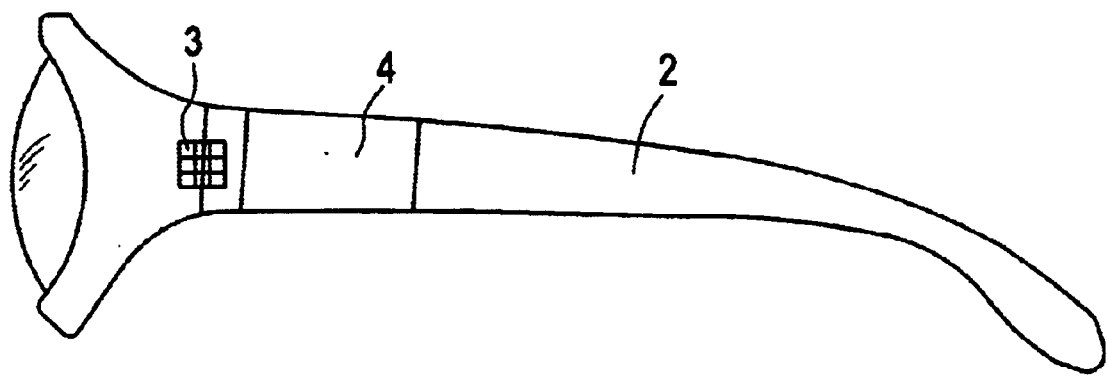
FIG. 1 shows a side view of the eyeglass frame according to the invention.
Figure 2:
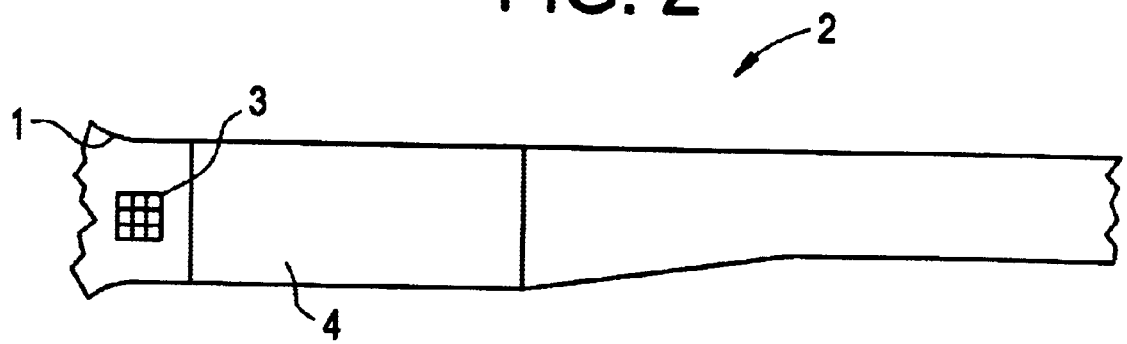
FIG. 2 shows a front view of a frame sidepiece according to the invention.

FIG. 2 shows a front view of an eyeglass frame sidepiece according to the invention. The frame comprises in a known manner a front part (1) and sidepieces (2) connected to the front part by hinges (3).

The variable nature of the eyeglass frame according to the invention stems from the presence of a decorative element (4). This decorative element (4) is reversible, which makes it possible to make visible alternatively one or the other of the surfaces, each of which can have a different design, color, graphic or texture.

Figure 3:
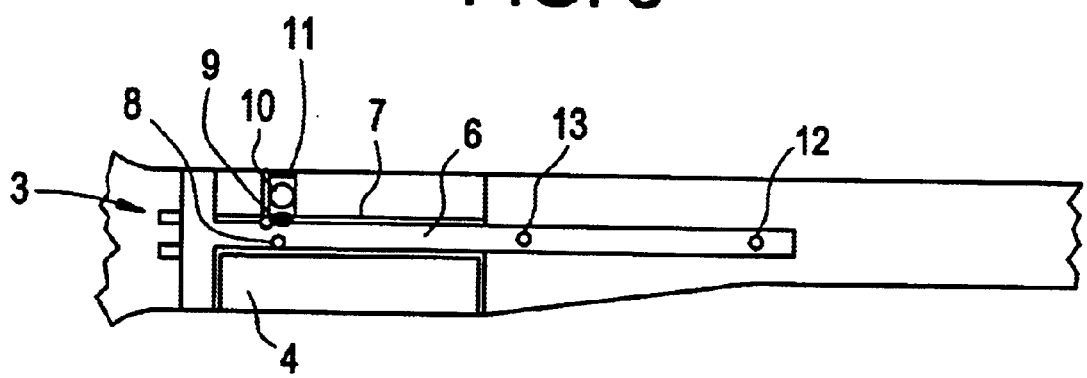
FIG. 3 shows a view along a longitudinal sectional plane of the sidepiece.
Figure 4:
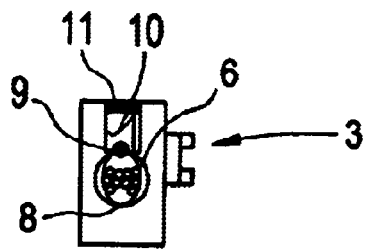
FIG. 4 shows a view along a cross section of the sidepiece.

The sidepiece (2) has a fixed part connected to the hinge (3) as shown in the longitudinal and cross sectional views constituting FIGS. 3 and 4, respectively.

The decorative element (4) has a cylindrical passage (7) for passage of the cylindrical pin (6).

The pin (6) has two diametrically opposite semispherical side faces (8). The function of these side faces is to lock a ball (9) positioned in a transverse cavity that penetrates into the edge of the decorative element (4). The ball is pushed towards the pin (6) by a spring (10). A screw (11) functions as the closure of the transverse cavity and the stop for the spring (10).

The decorative element can pivot between two stable positions determined by the cooperation of the ball (9) with one of the semispherical cavities (8) in the pin. The section of the pin (6) is advantageously on the order of 3 mm, and the thickness of the decorative element is advantageously on the order of 4 mm.

The pin is fixed on the fixed part of the sidepiece by screws (12, 13) passing through the pin (6). Similarly, it can be fixed on the hinge (3) by a screw passing through the pin.

Figure 5:
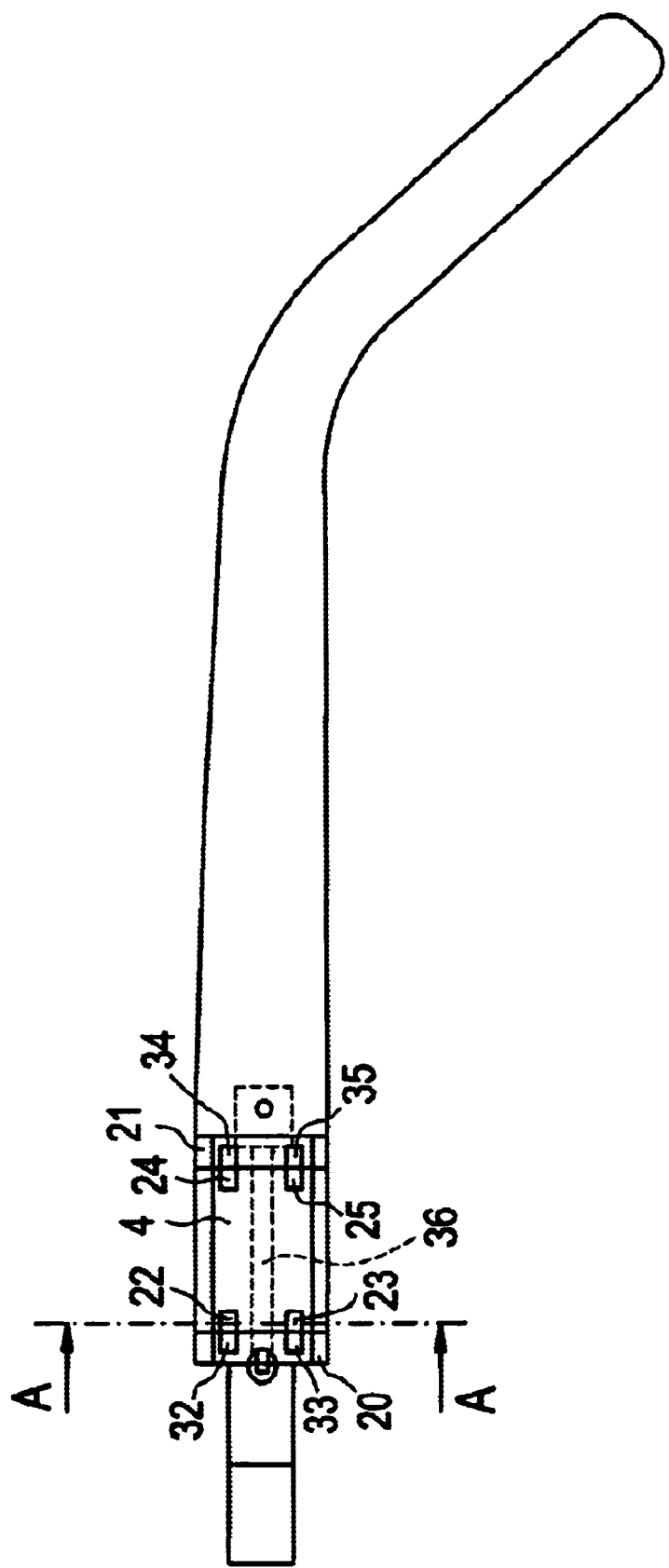
FIGS. 5 to 7 represent front, top and perspective views, respectively, of a variant of implementation.
Figure 6:
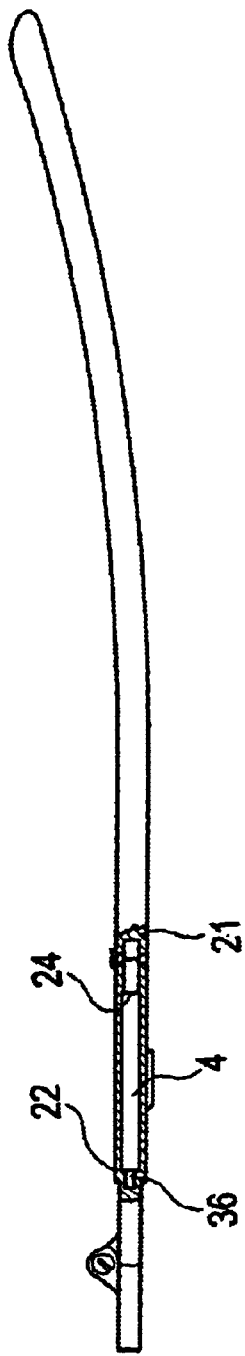
Figure 7:
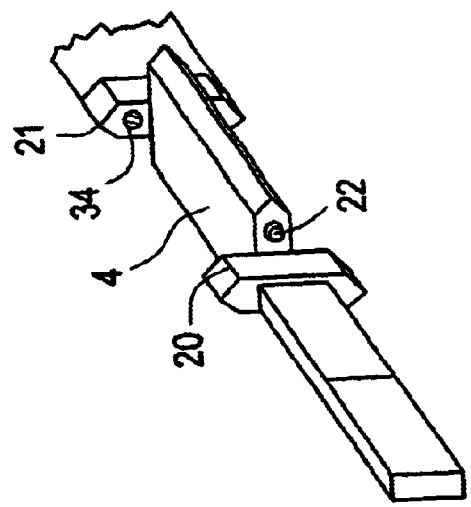

FIGS. 5 to 7 show front, top and perspective views, respectively, of a variant of implementation.

The decorative element is formed by a plastic piece of rectangular longitudinal section. The cross section conforms to the cross section of two fixed rings (20, 21) provided on the sidepiece of the frame. The front surfaces of the decorative element are plane with and adjacent to the fixed front surfaces. The decorative element (4) has magnets (22 to 25) at both ends which are inserted in the constitutive material of the decorative element. The rings (20, 21) also have permanent magnets (32 to 35) that are flush with the front surface. The magnetic poles are oriented in a manner such that in the two stable resting positions the opposite poles of two adjacent magnets face each other.

A pivoting axis (36) is fixed in a rigid manner on the two fixed parts (20, 21). The decorative element has a longitudinal hole to allow pivoting.

The invention was described above as a nonlimitative example. The expert in the field would be able to conceive different variants.

In particular, it would be possible to provide not just one but rather several pivoting decorative elements so as to create a multiplicity of possible combinations.

What is claimed is:

1. A variable eyeglass frame having sidepieces, each sidepiece comprising a fixed part having a pin, at least one pivotable decorative element movable between two positions on said pin, and a lock, said decorative element being articulated on the pin of which at least one end is interdependent with the sidepiece within one degree of freedom in rotation, wherein locking of the decorative element is implemented by a cavity oriented perpendicularly to the pin, in which cavity is housed a spring that exerts force on a ball which moves into a lock position when the decorative element is in a selected position, with said pin presenting diametrically opposite semispherical cavities for receiving said ball.

2. A variable eyeglass frame having sidepieces, each sidepiece comprising a fixed part having a pin, at least one pivotable decorative element movable between two positions on said pin, and a lock, said decorative element being articulated on the pin of which at least one end is interdependent with the sidepiece withing one degree of freedom in rotation, wherein lateral sides of the decorative element are planar with and present a section identical to a section of adjacent fixed parts, and wherein locking of the decorative element is implemented by a cavity oriented perpendicularly to the pin, in which cavity is housed a spring that exerts force on a ball which moves into a lock position when the decorative element is in a selected position, with said pin presenting diametrically opposite semispherical cavities for receiving said ball.

3. The variable eyeglass frame according to claim 1, wherein primary surfaces of the decorative element have dimensions determined to extend the fixed part of the sidepiece.

4. The variable eyeglass fame according to claim 1, wherein the decorative element has a recess for passage of the pivoting pin, which recess is of oblong section to provide two opposite preferential locking positions and to allow constrained switching from one position to the other.

5. The variable eyeglass from according to claim 1, comprising a multiplicity of decorative elements pivoting on the pin.

6. The variable eyeglass frame according to claim 1, wherein the decorative element is articulated on the pin, one end of which is interdependent with the sidepiece and the other end of which is interdependent with a hinge or a hinge of the frame.

7. The variable eyeglass frame according to claim 2, wherein the decorative element is articulated on the pin, one end of which is interdependent with the sidepiece and the other end of which is interdependent with a hinge or a hinge of the frame.

8. A variable eyeglass frame having sidepieces, each sidepiece comprising a fixed part having a pin, at least one pivotable decorative element movable between two positions on said pin, and a lock, said decorative element being articulated on the pin of which at least one end is interdependent with the sidepiece within one degree of freedom in rotation, wherein the lock mechanism of the decorative element comprises magnetic locking means which cooperates, according to two positions offset by 180°, with complementary means located on the sidepiece or on a hinge of the frame.

9. The variable eyeglass frame according to claim 8, wherein the decorative element comprises a magnet at each end arranged symmetrically with respect to an axis about which the decorative element pivots and is flush with a front surface of each end.

10. A variable eyeglass frame having side pieces, each side piece comprising:

a fixed part incorporating a pin having at least one end interdependent with said side piece with at least one degree of freedom of rotation;

at least one pivotable decorative element articulated on said pin, said decorative element being moveable between at least two positions; and a lock for locking said decorative element in said positions, said lock comprising at least one cavity oriented perpendicularly to said pin, a bias element housed within said cavity that exerts force on a stopping element that moves into a lock position when said decorative element is in said position.

11. The variable eyeglass frame according to claim 10, wherein another end of said decorative element is interdependent with a hinge in said eyeglass frame.

12. The variable eyeglass frame according to claim 10, wherein said decorative element includes lateral sides that are planar with said fixed part.

13. The variable eyeglass frame according to claim 10, wherein of said decorative element includes a primary surface dimensioned to extend said fixed part.

14. The variable eyeglass frame according to claim 10, wherein said decorative element includes a recess for passage of said pin, which recess is of oblong cross-section to provide two opposite preferential locking positions and to allow constrained switching from one position to the other.

15. The variable eyeglass frame according to claim 10, wherein said sidepiece comprises a plurality of said decorative elements.

16. A variable eyeglass frame having side pieces, each side piece comprising:

a fixed part incorporating a pin having at least one end interdependent with said sidepiece with one degree of freedom of rotation;

at least one pivotable decorative element articulated on said pin, said decorative element being moveable between at least two positions; and a magnetic lock for locking said decorative element in said positions.

17. The variable eyeglass frame according to claim 16, wherein said magnetic lock comprises a magnet at each end of said decorative element arranged symmetrically with respect to said pin about which said decorative element pivots and flush with a front surface of each end of said fixed part.

* * * * *